Patented July 24, 1951

2,562,118

UNITED STATES PATENT OFFICE 2,562,118

POLYTETRAFLUOROETHYLENE COATING COMPOSITIONS

Le Verne Kenneth Osdal, Upper Darby, Pa., assignor to E. I. du Pont de Nemours and Company, Wilmington, Del., a corporation of Delaware No Drawing. Application February 9, 1950, Serial No. 143,367

6 Claims. (Cl. 148—6.16)

This invention relates to coating compositions and, more particularly, to coating compositions containing polytetrafluoroethylene.

United States Patent No. 2,230,654 describes a method of preparing polytetrafluoroethylene. Copending application Serial No. 713,385, filed November 30, 1946, by Malcolm M. Renfrew, now U. S. Patent No. 2,534,058, discloses a method of preparing aqueous suspensoids of polytetrafluoroethylene, and Berry Patent No. 2,478,229 and copending application Serial No. 783,389, filed October 31, 1947, by Carol K. Ikeda, now abandoned, disclose methods of concentrating such suspensoids.

Films of polytetrafluoroethylene may be prepared by applying such aqueous suspensoids to suitable substrates and baking at or above the fusion temperature of the polymer (621° F.). However, apparently due to the waxy character of the polymer, such films do not possess a satisfactory degree of adhesion, according to paint, varnish, and enamel standards, when applied to relatively non-porous surfaces, such as metal, glass, and ceramics. It has been found that preliminary treatments and surface transformations, such as sandblasting, somewhat improve the adhesion of these polytetrafluoroethylene films, but the degree of adhesion is still not comparable to that of films of conventional organic coating compositions.

My copending application, Serial No. 103,747 filed July 8, 1949, discloses liquid coating compositions containing polytetrafluoroethylene which, when applied to a substrate and fused into a continuous film, possess a degree of adhesion which is comparable to that of conventional organic films. While such products adhere well to substrates generally classed as non-porous, such as metal, glass, and ceramics, it was recognized that one type of product would not necessarily provide the best adhesion for all of these substrates which, when compared critically, have substantially different characteristics.

It has now been found that the products of the copending application can be further improved, particularly for use on ferrous metal substrates.

Therefore, the principal object of this invention is to provide a liquid coating composition containing polytetrafluoroethylene which, when applied to ferrous metal substrates and fused into a continuous film, possesses markedly improved adhesion.

Another object is to provide a liquid coating composition containing polytetrafluoroethylene which, when applied to ferrous metal substrates and fused into a continuous film, possesses excellent adhesion thereto, and which is suitable for use as a primer coat under other polytetrafluoroethylene-containing compositions and/or other organic coatings.

Other objects will become apparent as the description proceeds.

These objects are accomplished by incorporating chromic acid and phosphoric acid in an aqueous suspensoid of polytetrafluoroethylene.

The term, "chromic acid," as used herein, is intended to include chromic anhydride, chromium trioxide, $CrO_3$, or the hypothetical substance $H_2CrO_4$. (See Hackh's Chemical Dictionary, 3d ed., 1944). References to quantities of chromic acid are expressed in terms of the equivalent anhydride $(CrO_3)$.

The term, "phosphoric acid," as used herein, is intended to include orthophosphoric acid, $H_3PO_4$, the hemihydrate of orthophosphoric acid, $(H_3PO_4)_2.H_2O$, and other hydrates of orthophosphoric acid. The term, "phosphoric acid," also includes the following substances in the presence of sufficient water to produce $H_3PO_4$ and/or its hydrates: anhydrous phosphoric acid, phosphorous pentoxide, phosphoric oxide, phosphoric anhydride, $P_2O_5$, and $P_4O_{10}$. (See J. W. Mellor, "Modern Inorganic Chemistry," 1927, and J. W. Mellor, "A Comprehensive Treatise on Inorganic and Theoretical Chemistry," Volume VIII, 1931).

In a preferred embodiment if this invention, a relatively concentrated aqueous suspensoid of polytetrafluoroethylene is diluted with a predetermined quantity of water. The mixture is agitated moderately to maintain uniformity. In a separate vessel, a predetermined quantity of chromic acid, phosphoric acid, and water are mixed until a solution is formed, and this solution is then added slowly to the diluted suspensoid while moderate agitation is continued to maintain uniformity and to prevent coagulation or precipitation of the polymer.

The following examples, in which the parts are by weight, illustrate embodiments of this invention and are given by way of illustration only:

EXAMPLE 1

Mixture A

| | Parts |
|---|---|
| Polytetrafluoroethylene suspensoid | 61.70 |
| "Duponol" ME | 1.31 |
| | 63.01 |

The polytetrafluoroethylene suspensoid had the following composition:

| | Percent |
|---|---|
| Finely divided polytetrafluoroethylene | 60.0 |
| "Duponol" ME | 0.6 |
| Water | 39.4 |
| | 100.0 |

"Duponol" ME is a commercially available wetting agent described as the sodium salt of the sulfuric acid ester of a mixture of long chain alcohols, predominantly lauryl alcohol.

Mixture A was prepared by agitating the suspensoid and the additional wetting agent moderately with a mechanical mixer.

Mixture B

| | Parts |
|---|---|
| Water | 17.17 |
| Chromic acid | 9.91 |
| Phosphoric acid 85% (aqueous) | 9.91 |
| | 36.99 |

The ingredients in Mixture B were mixed until clean and uniform and then added to Mixture A with continued agitation. Stirring was stopped when the two mixtures were thoroughly blended and substantially homogeneous. The resulting product, which represents a preferred embodiment of this invention, had the following composition:

Coating Composition C

| | Parts |
|---|---|
| Polytetrafluoroethylene | 37.00 |
| Chromic acid | 9.91 |
| Phosphoric acid | 8.42 |
| "Duponol" ME | 1.68 |
| Water | 42.99 |
| | 100.00 |

For comparative testing, a similar coating material was prepared according to my copending application Serial No. 103,747, filed July 8, 1949. It had the following composition:

Coating Composition D

| | Parts |
|---|---|
| Polytetrafluoroethylene | 37.00 |
| Chromic acid | 18.33 |
| "Duponol" ME | 1.68 |
| Water | 42.99 |
| | 100.00 |

Two 4" x 12" #24 gauge cold rolled steel panels were cleaned and lightly sanded, and a 1" x 12" strip along one edge of each of the panels was primer coated with Coating Compositions C and D, respectively. The panels were then baked in an electrically heated oven at 750° F. for 5 minutes to produce a continuous and adherent fused coating. The films were approximately 0.3 mil thick.

A topcoat film of the following composition was then applied over the entire surface of both panels; i. e., over the primed and unprimed portions:

Coating Composition E

| | Parts |
|---|---|
| Polytetrafluoroethylene | 44.0 |
| Water | 47.4 |
| "Duponol" ME | 2.6 |
| Toluene | 6.0 |
| | 100.0 |

Coating Composition E was an emulsified suspensoid made as described in my copending application Serial No. 137,890, filed January 10, 1950.

The topcoat film was built up by applying seven individual coats and baking at 750° F. for 5 minutes after each coat. The dry fused polytetrafluoroethylene topcoat films were about 5–6 mils thick.

The panels were cut into one-inch strips across the width to produce several 1" x 4" test sections. The partially primed panels thus had three inches coated with the polytetrafluoroethylene topcoat over the bare metal and one inch coated with the same topcoat over the primed portion.

The film on each panel was stripped for about one inch at the unprimed end and clamped in the lower jaws of a Scott Tester, Model X-2. The resulting bare portion of the metal test panel was clamped in the upper jaws. As the jaws moved apart, the film was pulled from the panel at an angle at substantially 180° (i. e., the stripped portion of the film was pulled back over the unstripped portion). When the stripped film reached the edge of primed portion, the force required for stripping increased sharply and the film stretched considerably or broke before adhesion was lost at the metal interface or at the topcoat interface.

The pounds pull required to destroy the adhesion of the polytetrafluoroethylene topcoat to the bare (unprimed) steel surface under these conditions ranged between 0.0+ and 0.3, with an average of about 0.2 (the instrument recording to only one decimal place).

With Coating Composition D, containing no phosphoric acid, the pounds pull ranged between 0.1 and 2.0, with an average of 1.0.

The pounds pull required to destroy adhesion at the metal-primer interface for Coating Composition C, containing phosphoric acid, ranged between 6.8 and 10.1 with an average of 8.6. In several cases, the adhesion at the metal interface exceeded the cohesion or tensile strength of the polytetrafluoroethylene topcoat and the latter film broke before the primer was pulled away from the metal.

It is apparent from these results that the polytetrafluoroethylene primer composition containing both chromic and phosphoric acids has markedly improved adhesion to steel. When compared to a polytetrafluoroethylene primer containing chromic but no phosphoric acid, the phosphoric acid-containing product has on the order of 8.6 times as much adhesion.

The following table gives values for the adhesion of the compositions of this invention versus similar compositions containing no phosphoric acid. The product of Example 1 is included. The panel preparation and testing on which these data are based are the same as in Example 1.

TABLE

| Example | Composition of Metal Priming Coat | | | | | (a) Pounds Pull Required to Destroy Adhesion | (b) Adhesion Factor [1] |
|---|---|---|---|---|---|---|---|
| | Polytetra-fluoro-ethylene | Phosphoric Acid | Chromic Acid | "Duponol" ME | Water | | |
| 1 | 66.9 | 15.2 | 17.9 | 3.0 | 77.7 | 8.6 | 43.0 |
| 1a | 66.9 | | 33.1 | 3.0 | 77.7 | 1.0 | 5.0 |
| 2 | 98.0 | 1.0 | 1.0 | 3.0 | 93.0 | 3.0 | 15.0 |
| 2a | 98.0 | | 2.0 | 3.0 | 93.0 | 1.6 | 8.0 |
| 3 | 90.0 | 5.0 | 5.0 | 3.0 | 94.0 | 2.5 | 12.5 |
| 3a | 90.0 | | 10.0 | 3.0 | 93.0 | 0.5 | 2.5 |
| 4 | 80.0 | 10.0 | 10.0 | 3.0 | 93.0 | 7.9 | 39.5 |
| 4a | 80.0 | | 20.0 | 3.0 | 91.0 | 4.5 | 22.5 |
| 5 | 30.0 | 35.0 | 35.0 | 3.0 | 74.1 | 6.0 | 30.0 |
| 5a | 30.0 | | 70.0 | 3.0 | 68.0 | 0.8 | 4.0 |
| 6 | 10.0 | 45.0 | 45.0 | | 64.0 | 5.5 | 27.5 |
| 6a | 10.0 | | 90.0 | | 56.0 | 0.5 | 2.5 |

[1] Column (a) over 0.2 (control).

The values in Column (a) of the table are the pounds required to strip the topcoat from the surface of the primer or to peel the adherent topcoat-primer system from the metal. The values are averages for several test sections cut from each panel and are representative of the improvements embodied in this invention over a wide range of ratios of polymer, chromic acid, phosphoric acid, water, wetting agent, and total solids.

EXAMPLE 7

*Mixture F*

| | Parts |
|---|---|
| Chromium tetrahydrate green pigment | 4.22 |
| Water | 10.30 |
| "Triton" N-100 | .34 |
| Pine oil | .34 |
| | 15.20 |

"Triton" N-100 is a commercially available wetting agent described as a long chain alkyl aryl polyether alcohol.

The ingredients of Mixture F were placed in a ball mill and ground until a smooth dispersion of finely divided pigment in water was produced.

*Coating Composition G*

| | Parts |
|---|---|
| Mixture F | 15.20 |
| Polytetrafluoroethylene suspensoid | 63.10 |
| Coating composition C | 21.70 |
| | 100.00 |

The polytetrafluoroethylene suspensoid was the same 60% aqueous suspensoid used in Mixture A of Example 1.

Coating Composition G was prepared by adding the ingredients in the order listed and agitating moderately with a mechanical mixer until uniform. The product was a green pigmented coating material with the following final composition:

| | Parts |
|---|---|
| Polytetrafluoroethylene | 45.89 |
| Chromic acid | 2.15 |
| Phosphoric acid | 1.83 |
| "Duponol" ME | .74 |
| "Triton" N-100 | .34 |
| Pine oil | .34 |
| Water | 44.49 |
| Chromium tetrahydrate | 4.22 |
| | 100.00 |

This product had better adhesion to steel than a similar material containing no phosphoric acid.

It will be understood that the particular wetting or dispering agents shown in the above examples form no part of this invention, and any suitable means for maintaining uniform distribution of the dispersed particles may be employed. Any wetting or dispersing agent may be used, providing it is stable in the presence of the other ingredients. The wetting agent concentrations shown are not critical, but controlled amounts are helpful in adjusting the final composition to yield optimum stability, application properies, appearance, and performance.

Polymeric materials, such as polymerized chlorotrifluoroethylene, or those containing preponderant amounts of polytetrafluoroethylene, such as copolymers of tetrafluoroethylene with other polymerizable materials, are operable provided they are stable in the presence of the other ingredients of the compositions of this invention.

When such a copolymer is used in the practice of this invention, it is preferred to use a copolymer of tetrafluoroethylene and ethylene, and, particularly, one which contains from 60% to 85% of tetrafluoroethylene and 40% to 15% of ethylene.

The solids concentration (total polymer and acid) of the final composition may vary over a wide range. A 15% solids composition deposits relatively thin films, and several coats are required in order to build up a film of normal thickness. The preferred 40% to 60% solids compositions are easily handled and produce continuous films of reasonable thickness in one coat. A 65% solids composition is usable where higher consistency can be employed.

The polymer concentration may also vary over a wide range, but it is desirable to keep it below about 75% of the total composition in order to avoid coagulation, precipitation, or "kick-out."

The total amount of chromic acid and phosphoric acid should be within the range of 1% to 90% of the combined polymer and acid content, and the preferred range is from 10% to 70%. The ratio of the phosphoric to chromic acid may vary between 10/90 and 90/10, and the preferred range is between 35/65 and 65/35.

Metaphosphoric acid ($HPO_3$) and pyrophosphoric acid ($H_4P_2O_7$), in the presence of agents which directly produce therefrom $H_3PO_4$ and/or its hydrates, may be substituted for the preferred $H_3PO_4$.

Any aqueous suspensoid of substantially completely polymerized polytetrafluoroethylene may be used in the practice of this invention, but the concentrated suspensoids are preferred.

If desired, modifying agents, such as pigments, fillers, organic solvents, and other film forming materials, may be added, provided they are compatible with and stable in the presence of the other ingredients. Such modifying agents are useful in imparting color, or enhancing hiding power, or providing other desirable properties to the compositions of this invention.

These compositions may be applied by any suitable means to any substrate capable of withstanding the high temperature required for fusing the polytetrafluoroethylene articles into a continuous film.

The polymer temperature at which fusion of the polytetrafluoroethylene occurs is about 621° F., but that a copolymer is somewhat less depending on the proportion and fusing point of the modifying material present. The maximum allowable temperature for either type of polymeric material is just short of that at which undesirable decomposition occurs (approximately 930° F. for the polytetrafluoroethylene).

The duration of the baking process varies over a wide range, depending on the method of heating, thermal properties of the substrate, and heat transfer conditions. The criterion is the fusion temperature of the polymer and maintenance of the polymer at this temperature for the period necessary to form a continuous film by fusion of the discrete particles. The source of heat is not critical, and it may be, for instance, infrared rays, hot air heated by combustion or by electricity, or direct flame.

When a composition of this invention has been applied to a ferrous metal substrate and baked as described, the resulting film adheres tenaciously to the substrate to a degree not previously possible with known polytetrafluoroethylene coating compositions. Furthermore, the adhesion is comparable to that of conventional synthetic organic enamel of the type commonly used on steel automobile bodies, refrigerator cabinets, and furniture.

The compositions of this invention are useful to improve adhesion in all cases where liquid coating compositions containing polytetrafluoroethylene are employed on ferrous metal substrates, principally common steels, as well as aluminum and aluminum alloys The compositions permit the use of polytetrafluoroethylene for these purposes in a manner similar to conventional liquid coating compositions where the antisticking properties, electrical properties, chemical resistance, or high temperature resistance of polytetrafluoroethylene are desirable or essential. Although the compositions of this invention are designed especially for ferrous metals, they may be used advantageously on other substrates, such as glass, ceramics, and non-ferrous metals. The adhesion of massive polytetrafluoroethylene (as in preformed sheets) to ferrous metal substrates is improved when the compositions of this invention are used as an intermediate adhesive layer.

It is apparent that many widely different embodiments of this invention can be made without departing from the spirit and scope thereof, and, therefore, it is not intended to be limited except as indicated in the appended claims.

I claim:
1. A coating composition comprising, as its essential constituents, an aqueous suspensoid of a polymer of tetrafluoroethylene and 1–90% of acid, based on the combined weight of polymer and acid, said acid consisting of chromic acid and phosphoric acid in a ratio of between 10:90 parts and 90:10 parts.

2. The coating composition of claim 1 in which the polymer and acid components are between 40% and 60% of the total composition.

3. A coating composition comprising, as its essential constituents, an aqueous suspensoid of a p olymer of tetrafluoroethylene and 1–90% of acid, based on the combined weight of polymer and acid, said acid consisting of chromic acid and phosphoric acid in a ratio of between 35:65 parts and 65:35 parts.

4. A coating composition comprising, as its essential constituents, an aqueous suspensoid of a polymer of tetrafluoroethylene and 10–70% of acid, based on the combined weight of polymer and acid, said acid consisting of chromic acid and phosphoric acid in a ratio of between 10:90 parts and 90:10 parts.

5. A coating composition comprising, as its essential constituents, 10–98% of a polymer of tetrafluoroethylene, 1–45% of chromic acid, and 1–45% of phosphoric acid, all based on the combined polymer and acid content.

6. A coating composition comprising, as its essential constituents, an aqueous suspensoid of polytetrafluoroethylene, a pigment, and 1–90% of acid, based on the combined weight of polymer and acid, said acid consisting of chromic acid and phosphoric acid in a ratio of between 10:90 parts and 90:10 parts.

LE VERNE KENNETH OSDAL.

REFERENCES CITED

The following references are of record in the file of this patent:

UNITED STATES PATENTS

| Number | Name | Date |
|---|---|---|
| 2,163,984 | Petkovic | June 27, 1939 |
| 2,385,800 | Douty et al. | Oct. 12, 1945 |
| 2,484,484 | Berry | Oct. 11, 1949 |
| 2,488,651 | Whiting et al. | Nov. 22, 1949 |

Certificate of Correction

Patent No. 2,562,118                                             July 24, 1951

LA VERNE KENNETH OSDAL

It is hereby certified that error appears in the printed specification of the above numbered patent requiring correction as follows:

Column 3, line 35, for "clean" read *clear*; column 6, line 2, for "dispering" read *dispersing*; line 29, for "properies" read *properties*; column 7, line 14, after "that" insert *of*; column 8, line 55, list of references cited, for "Oct. 12, 1945" read *Oct. 2, 1945*;

and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*